(12) United States Patent
Huang et al.

(10) Patent No.: US 11,658,366 B2
(45) Date of Patent: May 23, 2023

(54) ELECTROCHEMICAL DEVICE

(71) Applicant: Ningde Amperex Technology Limited, Fujian (CN)

(72) Inventors: Silin Huang, Fujian (CN); Huixin Wang, Fujian (CN); Sheng Cheng, Fujian (CN); Hongming Yu, Fujian (CN)

(73) Assignee: Dongguan Poweramp Technology Limited, Dongguan (CN)

( * ) Notice: Subject to any disclaimer, the term of this patent is extended or adjusted under 35 U.S.C. 154(b) by 451 days.

(21) Appl. No.: 16/672,550

(22) Filed: Nov. 4, 2019

(65) Prior Publication Data

US 2021/0057700 A1   Feb. 25, 2021

(30) Foreign Application Priority Data

Aug. 23, 2019 (CN) .......................... 201910785226.X

(51) Int. Cl.
*H01M 50/46* (2021.01)
*H01M 4/62* (2006.01)
(Continued)

(52) U.S. Cl.
CPC .......... *H01M 50/461* (2021.01); *H01M 4/623* (2013.01); *H01M 10/0525* (2013.01);
(Continued)

(58) Field of Classification Search
CPC . H01M 50/461; H01M 50/433; H01M 50/449
See application file for complete search history.

(56) References Cited

U.S. PATENT DOCUMENTS 10,038,193 B1 * 7/2018 Schroder .............. H01M 4/0411
10,541,401 B2 * 1/2020 Lee .................... H01M 10/0525
(Continued)

FOREIGN PATENT DOCUMENTS

CN           201364932        12/2009
CN           104852008         8/2015
(Continued)

OTHER PUBLICATIONS

Dongguan Amgen Tech Co. Ltd.; Office Action for Chinese patent application No. 201910785226.X, dated Jan. 20, 2022, 12 pgs.
(Continued)

*Primary Examiner* — Jonathan Crepeau
*Assistant Examiner* — Angela J Martin
(74) *Attorney, Agent, or Firm* — Taylor English Duma LLP

(57) ABSTRACT

The present application provides an electrochemical device. The electrochemical device, comprising: a positive electrode; a negative electrode; and the separator, disposed between the positive electrode and the negative electrode, wherein the separator comprising a porous substrate, a first coating layer and a second coating layer, the first coating layer and the second coating layer are on a surface of the porous substrate, the first coating layer is disposed on at least one side of the second coating layer, the first coating layer includes a first binder, and the second coating layer includes a second binder, the adhesive force between the first coating layer and the positive electrode or the negative electrode is greater than the adhesive force between the second coating layer and the positive electrode or the negative electrode. The electrochemical device provided by the present application can further improve the cycle performance of the electrochemical device.

19 Claims, 3 Drawing Sheets

(51) Int. Cl.
  *H01M 10/0525* (2010.01)
  *H01M 4/02* (2006.01)
  *H01M 50/457* (2021.01)
  *H01M 50/449* (2021.01)
(52) U.S. Cl.
  CPC ........ *H01M 50/449* (2021.01); *H01M 50/457* (2021.01); *H01M 2004/027* (2013.01); *H01M 2004/028* (2013.01)

(56) References Cited

U.S. PATENT DOCUMENTS

| | | |
|---|---|---|
| 2010/0323230 A1 | 12/2010 | Lee et al. |
| 2019/0237734 A1* | 8/2019 | Lee ................. C08J 7/0427 |
| 2019/0267596 A1* | 8/2019 | Guo ................. H01M 10/0565 |
| 2020/0266485 A1* | 8/2020 | Kushida ............ H01M 4/62 |
| 2020/0303707 A1* | 9/2020 | Zhou ................ H01M 10/4235 |
| 2020/0313171 A1* | 10/2020 | Wang ............... H01M 4/366 |
| 2020/0313176 A1* | 10/2020 | Wang ............... H01M 4/131 |

FOREIGN PATENT DOCUMENTS

| | | |
|---|---|---|
| CN | 107611314 | 1/2018 |
| CN | 107834007 | 3/2018 |
| CN | 107925114 | 4/2018 |
| CN | 207217641 | 4/2018 |
| CN | 108011067 | 5/2018 |
| CN | 108598338 | 9/2018 |
| CN | 108604702 | 9/2018 |
| CN | 207818722 | 9/2018 |
| CN | 108615829 | 10/2018 |
| JP | 2014199738 | 10/2014 |

OTHER PUBLICATIONS

Dongguan Amgen Tech Co. Ltd.; 2nd Office Action for Chinese patent application No. 201910785226.X, dated Sep. 6, 2022, 15 pgs.

* cited by examiner

ELECTROCHEMICAL DEVICE

CROSS-REFERENCE TO RELATED APPLICATION

This application claims priority to and benefits of Chinese Patent Application Serial No. 201910785226.X, filed with the China National Intellectual Property Administration on Aug. 23, 2019, and the entire content of which is incorporated herein by reference.

FIELD OF THE APPLICATION

The present application relates to the field of electrochemical device, in particular, to an electrochemical device.

BACKGROUND OF THE APPLICATION

At present, the binding layer of commercial separators mainly include oily polyvinylidene fluoride (PVDF) with high adhesion and water-soluble PVDF with weak adhesion. On the one hand, the oily polyvinylidene fluoride binding layer has good interfacial adhesive force, but it also makes the adhesion of the overall interface between the binding layer and the positive or negative electrode too strong, resulting in slow transfer of the electrolyte between the separator and the positive or negative electrode. During the cycle, the electrolyte in the middle of the positive or negative electrode is not replenished in time, and lithium precipitation/black spots appear in the middle of the positive or negative electrode, causing the capacity of the lithium ion battery to drop sharply, greatly reducing the cycle life of the lithium ion battery. On the other hand, using a weakly adhesion aqueous PVDF binding layer, the interface between the separator and the positive or negative electrode in the head and tail regions of the electrode assembly is liable to separate, resulting in the disconnection of the ion channel between the positive and negative electrodes, so that lithium precipitation/black spots are caused, causing a sharp drop in the capacity of the lithium ion battery, which greatly reduces the cycle life of the lithium ion battery.

SUMMARY OF THE APPLICATION

The present application solves the problem of the adhesion of the separator and the positive or negative electrode of the electrochemical device and the electrolyte transport at the interface between the separator and the positive or negative electrode by using a non-uniform separator binding layer, so as to greatly extend the cycle life of the electrochemical device.

The present application provides an electrochemical device, comprising: a positive electrode; a negative electrode; and the separator, disposed between the positive electrode and the negative electrode, wherein the separator comprising a porous substrate, a first coating layer and a second coating layer, the first coating layer and the second coating layer are on a surface of the porous substrate, the first coating layer is disposed on at least one side of the second coating layer, the first coating layer includes a first binder, and the second coating layer includes a second binder, the adhesive force between the first coating layer and the positive electrode or the negative electrode is greater than the adhesive force between the second coating layer and the positive electrode or the negative electrode.

In the above electrochemical device, the number of the first coating layers is at least two, and the second coating layer is disposed between the two first coating layers.

In the above electrochemical device, the first coating layer is disposed to surround the second coating layer.

In the above electrochemical device, the adhesive force between the first coating layer and the positive electrode or the negative electrode is from 1 N/m to 100 N/m, and the adhesive force between the second coating layer and the positive electrode or the negative electrode is from 0.2 N/m to 5 N/m.

In the above electrochemical device, a ratio of a width of the first coating layer to a total width of the coating in the width direction of the first coating layer is less than or equal to 25%.

In the above electrochemical device, the thickness of the first coating layer is less than the thickness of the second coating layer.

In the above electrochemical device, the first coating has a width of 1 mm to 125 mm, the first coating layer has a thickness of 0.05 µm to 5 µm, and the second coating layer has a thickness of 0.1 µm to 30 µm.

In the above electrochemical device, a granularity of the first binder is less than a granularity of the second binder.

In the above electrochemical device, the first binder has a granularity of 10 nm to 5 µm, and the second binder has a granularity of 0.5 µm to 30 µm.

In the above electrochemical device, a softening temperature of the first binder is less than a softening temperature of the second binder.

In the above electrochemical device, the first binder has a softening temperature of 50° C. to 150° C., and the second binder has a softening temperature of 80° C. to 200° C.

In the above electrochemical device, a degree of swelling of the first binder is greater than a degree of swelling of the second binder.

In the above electrochemical device, the first binder has a degree of swelling of 30% to 300%, and the second binder has a degree of swelling of 1% to 100%.

In the above electrochemical device, the electrochemical device further comprising a third coating layer disposed between the porous substrate and the first coating layer and between the porous substrate and the second coating layer, the third coating layer includes inorganic particles and a third binder.

In the above electrochemical device, the first binder and the second binder are each selected from at least one of polyvinylidene fluoride, polyvinylidene fluoride-hexafluoroethylene, polyacrylate, polymethyl methacrylate, polyethylene oxide, polyacrylonitrile and styrene butadiene rubber.

In the above electrochemical device, the front and back sides of the porous substrate are provided with the first coating layer and the second coating layer.

In the above electrochemical device, the porous substrate is a polymer film, a multilayer polymer film, or a nonwoven fabric formed of any one or more of polyethylene, polypropylene, polyethylene terephthalate, polyphthalaldehyde phenyl diamine, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene.

In the above electrochemical device, the first coating layer is only disposed on one side of the second coating layer.

In the above electrochemical device, the electrochemical device comprises lithium ion battery.

In the above electrochemical device, the lithium ion battery is wound or stacked.

The separator provided by the present application can not only obtain good adhesive force with the positive or negative electrode, but also achieve good electrolyte transfer at the interface between the separator and the positive or negative electrode, so as to further improve the cycle performance of the electrochemical device.

BRIEF DESCRIPTION OF THE ACCOMPANYING DRAWINGS

DETAILED DESCRIPTION OF THE PREFERRED EXAMPLES

The exemplary examples are described in sufficient detail below, but these exemplary examples may be implemented in various ways and should not be construed as being limited to the examples set forth herein. Rather, these examples are provided so that the present application will be thorough and complete and the scope of the present application is fully conveyed to those skilled in the art.

Figure 6:
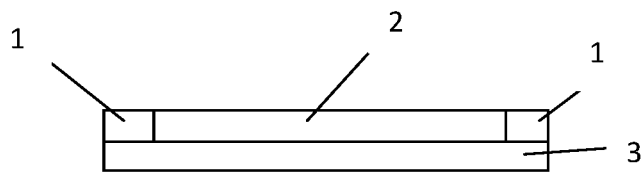
FIG. 6 shows a cross-section view of a separator of an electrochemical device according to some examples of the present application.
Figure 7:
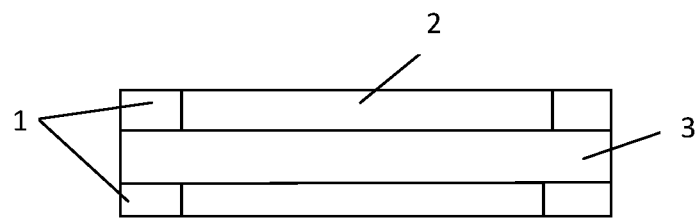
FIG. 7 shows a cross-section view of a separator of an electrochemical device according to some examples of the present application.
Figure 8:
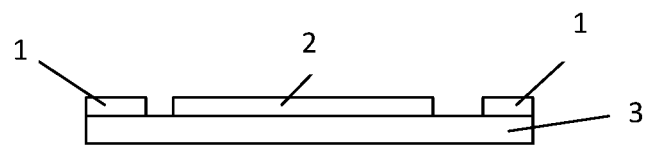
FIG. 8 shows a cross-section view of a separator of an electrochemical device according to some examples of the present application.

With reference to FIGS. 1 to 8, wherein FIGS. 1 to 5 show a schematic view of a first coating layer and a second coating layer according to some examples of the present application, and FIGS. 6 to 8 show a cross-section view of a separator according to some examples of the present application. The electrochemical device of the present application comprises a positive electrode, a negative electrode, and a separator disposed between the positive electrode and the negative electrode, wherein the separator comprises a porous substrate 3 and a first coating layer and a second coating layer on at least one surface of the porous substrate 3, wherein the first coating layer is disposed on at least one side of the second coating layer. As shown in FIGS. 1 to 5, the first coating layer 1 is disposed on one side of the second coating layer 2 and disposed on both sides of the second coating layer 2 (for example, the second coating layer is disposed between the two first coating layers) or disposed to surround the second coating 2. Although the first coating layer 1 in FIGS. 1 to 5 is shown in direct contact with the second coating layer 2, it should be understood that, referring to FIG. 8, the first coating layer 1 may not be in direct contact with the second coating layer 2.

The porous substrate 3 is a polymer film, a multilayer polymer film, or a nonwoven fabric formed of any one or more of polyethylene, polypropylene, polyethylene terephthalate, polyphthalaldehyde phenyl diamine, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene. The polyethylene is selected from at least one component of high density polyethylene, low density polyethylene, and ultra-high molecular weight polyethylene. The porous substrate 3 may have an average pore diameter of 0.001 μm to 10 μm. The porous substrate 3 may have a porosity of 5% to 95%. In addition, the porous substrate 3 may have a thickness of 0.5 μm and 50 μm.

In the present application, the first coating layer includes a first binder, and the second coating layer includes a second binder, and the adhesive force between the first coating layer 1 and the positive or negative electrode is higher than the adhesive force between the second coating layer 2 and the positive or negative electrode. For example, the adhesive force between the first coating layer 1 and the positive or negative electrode is from 1 N/m to 100 N/m, and the adhesive force between the second coating layer 2 and the positive or negative electrode is from 0.2 N/m to 5 N/m. By providing different adhesion in the first coating layer and the second coating layer, a good adhesion between the first and the second coating layer and the positive or negative electrode may be ensured while achieving good electrolyte transport at the interface between the separator and the positive or negative electrode.

Figure 1:
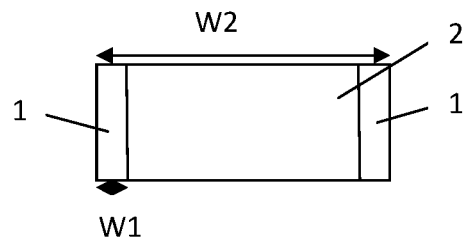
FIG. 1 shows a schematic view of a first coating layer and a second coating layer according to some examples of the present application.
Figure 2:
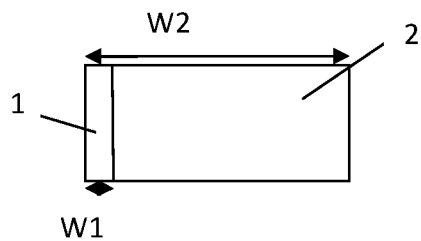
FIG. 2 shows a schematic view of a first coating layer and a second coating layer according to some examples of the present application.
Figure 3:
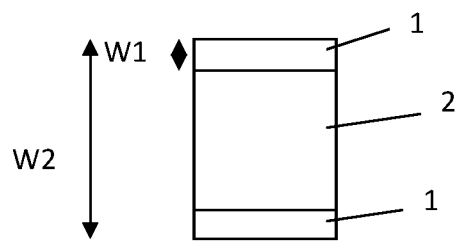
FIG. 3 shows a schematic view of a first coating layer and a second coating layer according to some examples of the present application.
Figure 4:
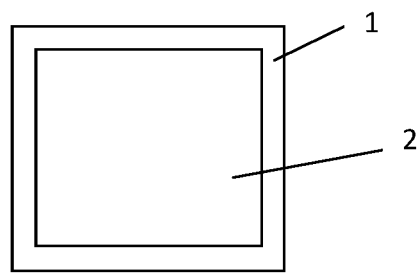
FIG. 4 shows a schematic view of a first coating layer and a second coating layer according to some examples of the present application.
Figure 5:
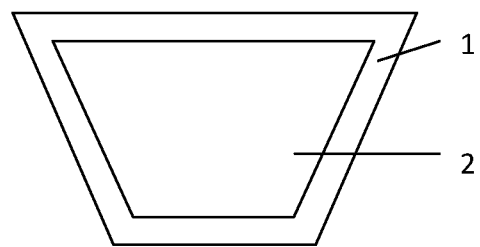
FIG. 5 shows a schematic view of a first coating layer and a second coating layer according to some examples of the present application.

In some examples, the ratio of the width of the first coating layer 1 on at least one side of the second coating layer 2 to the total width of the coating layer in the width direction of the first coating layer is less than or equal to 25%. Among which, the first coating layer may have a width of 1 mm to 125 mm. As shown in FIG. 1, when the separator of the present application is used for a wound electrode assembly, the position of the first coating layer corresponds to the head and tail region of the separator, and the position of the second coating layer corresponds to the body region in the middle of the separator. As shown in FIGS. 1 to 3, when the separator of the present application is used for a stacked electrode assembly, the position of the first coating layer corresponds to the head, tail, head and tail, two sides of the separator or surrounding the second coating layer 2, and the position of the second coating layer corresponds to the body region in the middle of the separator. The head and tail regions of the separator are most easily separated due to edge effects (edge is the induced point), and the middle body region of the separator is difficult to appear induced point to induce the interface damage. Therefore, the adhesion of the head and tail regions should be strengthened, so as to solve the problem that the head and tail regions of the aqueous PVDF binding layer separator causes a sharp drop in the capacity of the electrochemical device due to interface separation due to weak adhesive force. Further, through good electrolyte conduction path in the body region in the middle of the separator, the present application may solve the problem that central black spot/lithium precipitation is caused by insufficient electrolyte replenishment in the middle region of the electrode assembly caused by current high-viscosity separator (such as oily PVDF binding layer separator).

In some examples, the first coating layer includes a first binder, and the second coating layer includes a second binder. The first binder and the second binder may be independently selected from at least one of polyvinylidene fluoride, polyvinylidene fluoride-hexafluoroethylene, polyacrylate, polymethyl methacrylate, polyethylene oxide, polyacrylonitrile and styrene butadiene rubber. The first binder may be the same as or different from the second binder.

In some examples, the thickness of the first coating layer is less than the thickness of the second coating layer, because the first coating layer needs to provide good electrolyte conduction channels while the second coating layer needs to provide stronger adhesion. Therefore, by separately disposing the thicknesses of the first coating layer and the second coating layer, a good adhesion between the first and the second coating layer and the positive or negative electrode may be ensured while achieving good electrolyte transport at the interface between the separator and the positive or negative electrode.

In some examples, the first coating layer has a thickness of 0.05 μm to 5 μm, and the second coating layer has a thickness of 0.1 μm to 30 μm. This thickness range of the first coating layer and the second coating layer may reduce the effect on the thickness of the electrode assembly while ensuring the adhesion at the interface between the separator and the positive or negative electrode. For a wound electrode assembly, the compressibility of the first coating layer may reduce the corner stress concentration of the positive or negative electrode in cyclic expansion process. The greater the thickness of the second coating layer, the higher the liquid holding ability, the smoother the electrolyte transport, and the black spots/lithium precipitation in the middle of the electrode assembly during the cycle will not appear, and the cycle performance may be improved. Of course, too much thickness will sacrifice the energy density of the electrochemical device.

In some examples, the granularity of the first binder is less than the granularity of the second binder. This is because if the particles are too small, the coverage is too high, which causes the electrolyte to be transported slowly at the interface between the positive or negative electrode and the separator, causing black spots/lithium precipitation, and the black spots/lithium precipitation cause a sharp decrease in the capacity of the lithium ion battery. In addition, the particle being too large may lose the adhesive force between the separator and the positive or negative electrode, and since the adhesive force is too small, the risk of interface separation after long-term circulation becomes large. In the case of the same binder particles, the coverage is positively correlated with the adhesive force. The greater the adhesive force, the more difficult the interface between the separator and the positive or negative electrode is to be separated, and the cycle is prolonged. However, the electrolyte may be transported slowly, which may easily lead to black spots/lithium precipitation, thereby accelerating the decrease of the capacity of the electrochemical device, especially when black spots/lithium precipitation occurs in the middle portion of the positive or negative electrode. Therefore, the adhesive force between the positive or negative electrode and the middle portion of the separator does not have to be too high, thereby avoiding problems in electrolyte transport, thereby causing black spots/lithium precipitation. So, the granularity of the first binder is less than the granularity of the second binder.

In some examples, the first binder has a granularity (Dv50) of 10 nm to 5 μm, and the second binder has a granularity of 0.5 μm to 30 μm. Dv50 represents that the particle diameter reach 50% of the cumulative volume from the side of small granularity in the granularity distribution on a volume basis. If the particles are too small (i.e. the first binder has a granularity of less than 10 nm, and the second binder has a granularity of less than 0.5 μm), the coverage is too high, which causes the electrolyte to be transported slowly at the interface between the positive or negative electrode and the separator, causing black spots/lithium precipitation, and the black spots/lithium precipitation cause a sharp decrease in the capacity of the lithium ion battery. In addition, the particle being too large (i.e. the first binder has a granularity of greater than 5 μm, and the second binder has a granularity of greater than 30 μm) may lose the adhesive force between the separator and the positive or negative electrode, and since the adhesive force is too small, the risk of interface separation after long-term circulation becomes large.

In some examples, the softening temperature of the first binder is less than the softening temperature of the second binder, and the softening temperature is the temperature at which the polymer begins to melt. The use temperature of the lithium ion battery is usually between −10° C. and 50° C. The softening temperature of the first binder and the second binder may ensure that the lithium ion battery may not soften during use. In addition, the interfacial forming temperature of the lithium ion battery is usually between 50° C. and 100° C. The softening temperature of the binder is higher than the interfacial forming temperature. The lower the softening degree of the binder, the worse the riveting with the positive or negative electrode, the lower the adhesive force, but the interface gap is larger, so that the electrolyte transfer will be more unobstructed. Therefore, by differentiating arrangement the softening temperature of the first binder of the first coating layer and the second binder of the second coating layer, the lithium ion battery can be free of black spots/lithium precipitation, and the cycle performance of the lithium Ion battery is effectively improved.

In some examples, the first binder has a softening temperature of 50° C. to 150° C., and the second binder has a softening temperature of 80° C. to 200° C. If the softening temperature of the binder is too high (i.e. the first binder has a softening temperature of greater than 150° C. and the second binder has a softening temperature of greater than 200° C.), The achievable softening degree of the bin der is lower, the riveting with the electrode is worse, the adhesive force is lower; If the softening temperature of the binder is too low (i.e. the first binder has a softening temperature of less than 50° C. and the second binder has a softening temperature of less than 80° C.), the lithium ion battery may appear soften during use.

In some examples, the degree of swelling of the first binder is greater than the degree of swelling of the second binder, the degree of swelling can affect the transport of the electrolyte. When the degree of swelling of the first binder is greater than the degree of swelling of the second binder, it is ensured that the binder in the region where the first binder and the second binder are located is reduced to block the pores in the separator to different degrees in the interfacial forming process, which in turn beneficial to the transport of the electrolytic solution. Therefore, by differentiating arrangement the degree of swelling of the first binder and the second binder, the lithium ion battery can be free of black spots/lithium precipitation, and the cycle performance of the lithium Ion battery is effectively improved.

In some examples, the first binder has a degree of swelling of 30% to 300%, and the second binder has a degree of swelling of 1% to 100%. By using the degree of swelling of the first binder and the second binder in the present application, it is ensured that the binder is reduced to block the pores in the separator in the interfacial forming process, which in turn beneficial to the transport of the electrolytic solution.

In some examples, the electrochemical device of the present application further comprises a third coating layer disposed between the porous substrate and the first coating layer and/or the second coating layer. The third coating layer comprises inorganic particles and a third binder, the inorganic particles such as ceramics. The third binder is selected from at least one of the following polymers: polyvinylidene fluoride, polyvinylidene fluoride-hexafluoropropylene, polyacrylate, polymethyl methacrylate, polyethylene oxide, polyacrylonitrile and styrene butadiene rubber. The third coating layer may have any suitable thickness, for example, 0.5 μm to 10 μm.

An exemplary preparation method of the separator of the present application is described below. The method comprises: dissolving the two binders separately in water and forming a uniform slurry by mechanical stirring, coating the two slurries separately to a porous substrate (or a third coating layer (for example, an inorganic coating layer) on a porous substrate), wherein the two slurry coating layers are divided into two distinct areas (see, for example, FIG. 1), and wherein the first coating layer 1 is located in a high viscosity region, the second coating layer 2 is located in a low viscosity region.

In order to coat the slurry on the surface of the porous substrate, any method known to those skilled in the art may be used, including dip coating, die coating, roll coating, knife coating, or a combination thereof.

In the present application, a lithium ion battery is merely an illustrative example of an electrochemical device, which may also include other suitable devices. The lithium ion battery further comprises a positive electrode, a negative electrode and an electrolyte, wherein the separator is inserted between the positive electrode and the negative electrode. The positive electrode includes a positive current collector, and the negative electrode includes a negative current collector. The positive current collector may be an aluminum foil or a nickel foil, and the negative current collector may be a copper foil or a nickel foil.

Positive Electrode

The positive electrode includes a positive electrode material including a positive electrode material (hereinafter, sometimes referred to as "positive electrode material capable of intercalating/deintercalating lithium Li") capable of intercalating and deintercalating lithium (Li). Examples of the positive electrode material capable of intercalating/ deintercalating lithium Li may include lithium cobaltate, lithium nickel cobalt manganese oxide, lithium nickel cobalt aluminate, lithium manganate, lithium manganese iron phosphate, lithium vanadium phosphate, lithium vanadium phosphate, lithium iron phosphate, lithium titanate, and lithium-rich manganese-based materials.

Specifically, the chemical formula of lithium cobaltate may be as chemical formula 1:

  chemical formula 1 wherein M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b and c are respectively in the following ranges: $0.8 \leq x \leq 1.2$, $0.8 \leq a \leq 1$, $0 \leq b \leq 0.2$, $-0.1 \leq c \leq 0.2$;

the chemical formula of lithium nickel cobalt manganese oxide or lithium nickel cobalt aluminate may be as chemical formula 2:

  chemical formula 2 wherein M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and the values of y, d, e and f are respectively in the following ranges: $0.8 \leq y \leq 1.2$, $0.3 \leq d \leq 0.98$, $0.02 \leq e \leq 0.7$, $-0.1 \leq f \leq 0.2$;

the chemical formula of lithium manganese oxide may be as chemical formula 3:

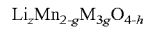  chemical formula 3 wherein M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g, and h are respectively in the following ranges: $0.8 \leq z \leq 1.2$, $0 \leq g \leq 1.0$ and $-0.2 \leq h \leq 0.2$.

Negative Electrode

The negative electrode includes a negative electrode material including the negative electrode material (hereinafter, sometimes referred to as "negative electrode material capable of intercalating/deintercalating lithium Li") capable of intercalating and deintercalating lithium (Li). Examples of the negative electrode material capable of intercalating/ deintercalating lithium Li may include carbon materials, metal compounds, oxides, sulfides, nitrides of lithium such as $LiN_3$, lithium metal, metals which form alloys together with lithium and polymer materials.

Examples of carbon materials may include low graphitized carbon, easily graphitizable carbon, artificial graphite, natural graphite, mesocarbon microbeads, soft carbon, hard carbon, pyrolytic carbon, coke, vitreous carbon, organic polymer compound sintered body, carbon fiber and activated carbon. Among them, coke may include pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may include polyacetylene and polypyrrole.

Further, in the negative electrode material capable of intercalating/deintercalating lithium Li, a material who's charging and discharging voltages are close to the charging and discharging voltages of lithium metal is selected. This is because the lower the charging and discharging voltage of the negative electrode material, the easier the electrochemical device (such as lithium ion battery) is to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalating/deintercalating lithium (Li) may include elemental lithium metal, metal elements and semimetal elements capable of forming an alloy together with lithium (Li), and alloys and compounds of such elements. In particular, they are used together with carbon materials because in this case, good cycle characteristics as well as high energy density may be obtained. In addition to alloys comprising two or more metal elements, the alloys used herein also include alloys comprising one or more metal elements and one or more semi-metal elements. The alloy may be in the form of a solid solution, a eutectic crystal (eutectic mixture), an intermetallic compound, and a mixture thereof.

Examples of the metal element and the semi-metal element may include tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf).

Examples of above alloys and compounds may include a material having a chemical formula $Ma_sMb_tLi_u$ and a material having a chemical formula $Ma_pMc_qMd_r$. In these chemical formulae, Ma denotes at least one of a metal element and a semi-metal element capable of forming an alloy together with lithium; Mb denotes at least one of a metal element and a semi-metal element other than lithium and Ma; Mc denotes at least one of the non-metallic elements; Md denotes at least one of a metal element and a semi-metal element other than Ma; and s, t, u, p, q and r meets $s>0$, $t\geq0$, $u\geq0$, $p>0$, $q>0$ and $r\geq0$.

Further, an inorganic compound not including lithium (Li) such as $MnO_2$, $V_2O_5$, $V_6O_{13}$, NiS, and MoS may be used in the negative electrode.

Electrolyte

The above lithium ion battery further includes an electrolyte which may be one or more of a gel electrolyte, a solid electrolyte and an electrolytic solution, and the electrolytic solution includes a lithium salt and a non-aqueous solvent.

The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt selects $LiPF_6$ because it may give high ionic conductivity and improved cycle characteristics.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylene propyl carbonate (EPC), and methyl ethyl carbonate (MEC) and combinations thereof. Examples of the cyclic carbonate compound are ethylene carbonate (EC), propylene carbonate (PC), butylene carbonate (BC), vinyl ethylene carbonate (VEC), and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

Examples of the carboxylate compound are methyl acetate, ethyl acetate, n-propyl acetate, t-butyl acetate, methyl propionate, ethyl propionate, propyl propionate, γ-butyrolactone, azlactone, valerolactone, mevalonolactone, caprolactone, methyl formate and combinations thereof.

Examples of the ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate and phosphate, and combinations thereof.

Although the above is exemplified by a lithium ion battery, those skilled in the art can understand that the technical solutions of the present application may be used for other suitable electrochemical devices after reading the present application. Such electrochemical devices include any devices that generate an electrochemical reaction, and specific examples thereof include all kinds of primary batteries, secondary batteries, fuel batteries, solar batteries, or capacitors.

The electrochemical device may be fabricated using conventional methods known to those skilled in the art. In one example of the method of fabricating an electrochemical device, the electrode assembly is formed with a separator interposed between the positive electrode and the negative electrode, and then a liquid electrolyte is injected into the electrode assembly, thereby providing the electrochemical device. Depending on the method of manufacture and the required properties for the final product, the electrolyte may be injected in a suitable step during the manufacturing process of the electrochemical device. In other words, the liquid electrolyte may be injected prior to assembly of the electrochemical device or at the final step during assembly of the electrochemical device.

Hereinafter, a lithium ion battery is taken as an example and a preparation of the lithium ion battery is described in conjunction with specific examples. Those skilled in the art will understand that the preparation method described in the present application is merely an example, and any other suitable preparation methods are within the scope the present application.

The preparation process of the lithium ion battery of the examples and comparative examples of the present application is as follows:

Comparative Example 1

(1) Preparation of Separator

Polyvinylidene fluoride (PVDF) is dissolved in N-methylpyrrolidone (NMP) for completely dissolving, wherein the granularity of polyvinylidene fluoride is 1.5 μm, a uniform slurry is formed by mechanical stirring, and then the slurry is coated onto both side surfaces of a porous substrate on which two sides of a 2 μm thick ceramic coating layer had been coated (polyethylene, with thickness of 5 μm, average pore diameter of 0.073 μm, porosity of 26%), so as to form a separator after drying, wherein the slurry coating layer (i.e., the first coating layer) has a thickness of 4 μm and a coverage of 31%. The separator is slit into strips of 70 mm width for the subsequent preparation of lithium ion battery.

(2) Preparation of the Positive Electrode

A positive active substance of $LiCo_{0.92}Mg_{0.03}Al_{0.02}Ti_{0.03}O_2$, a conductive agent of acetylene black, and a binder of polyvinylidene fluoride (PVDF) are dissolved in an N-methylpyrrolidone solvent system at a mass ratio of 94:3:3 for thoroughly stirring and uniformly mixing then coated on a positive current collector of aluminum foil for drying, cold-pressing, and slitting to obtain a positive electrode.

(3) Preparation of the Negative Electrode

A negative active substance of artificial graphite, a conductive agent of acetylene black, a binder of styrene-butadiene rubber (SBR), and a thickener of sodium carboxymethyl cellulose (CMC) are dissolved in a deionized water solvent system at a mass ratio of 96:1:1.5:1.5, then coated on a negative current collector of Cu foil for drying, cold-pressing, and slitting to obtain a negative electrode.

(4) Preparation of Electrolyte

A solution prepared by mixing a lithium salt of $LiPF_6$ and a non-aqueous organic solvent (ethylene carbonate (EC): diethyl carbonate (DEC):propylene carbonate (PC):propyl propionate (PP):vinylene carbonate (VC)=20:30:20:28:2) at a mass ratio of 8:92 is used as an electrolyte of the lithium ion battery.

(5) Preparation of Lithium Ion Battery

The positive electrode, the separator, and the negative electrode are stacked in this order, so that the separator is in the middle of the positive electrode and the negative electrode to function as a safe isolation, and then an electrode assembly is obtained by winding. The adhesion is formed between the electrode and the separator by an interfacial forming temperature of 80° C. (pressure of 1 MPa). The electrode assembly is placed in package housing, injected with an electrolytic solution and packaged to obtain the lithium ion battery.

Comparative Example 2

The preparation method is the same as that of Comparative Example 1, except that the coverage of the slurry coating layer (first coating layer) in Comparative Example 2 is 15%.

Comparative Example 3

The preparation method is the same as that of Comparative Example 1, except that the electrode assembly in Comparative Example 3 is of a stacked type.

Example 1

The preparation method is the same as that of Comparative Example 1, except that the preparation method of the separator of Example 1 is: dissolving the first binder of polyvinylidene fluoride and the second binder of polyvinylidene fluoride in water respectively, and forming a uniform slurry by mechanical stirring, wherein the first binder has a granularity of 0.05 μm, and the second binder has a granularity of 0.5 μm, and coating the two slurries respectively to corresponding regions on both side surfaces of the porous substrate on which a two-sided 2 μm thick ceramic coating layer has been coated (polyethylene, with thickness of 5 μm, average pore diameter of 0.073 μm, porosity of 26%), so as to form a separator after drying, wherein the first coating layer where the first binder is located has a width W1=10 mm and a coating thickness of 0.5 μm, which is located in a high viscosity region, the high viscosity region corresponds to the head and tail of the electrode assembly, and the first binder has a coverage of 60% in the high viscosity region. The second coating layer where the second binder is located has a width (W2−2W1) of 50 mm, and a coating thickness of 1 μm, which is located in a low viscosity region, and the second binder has a coverage of 25% in the low viscosity region.

Example 2

The preparation method is the same as that of Example 1, except that in Example 2, the first binder has a granularity of 0.4 μm, the second binder has a granularity of 1.3 μm; the first coating layer has a coating thickness of 4 μm, and the second coating layer has a coating thickness of 4 μm; the first binder has a coverage of 31% in the high viscosity region, and the second binder has a coverage of 22% in the low viscosity region.

Example 3

The preparation method is the same as that of Example 1, except that in Example 3, the first binder has a granularity of 1.5 μm, the second binder has a granularity of 2.8 μm; the first coating layer has a coating thickness of 4 μm, and the second coating layer has a coating thickness of 4 μm; the first binder has a coverage of 31% in the high viscosity region, and the second binder has a coverage of 17% in the low viscosity region.

Example 4

The preparation method is the same as that of Example 1, except that in Example 4, the first binder has a granularity of 2.6 μm, the second binder has a granularity of 5.9 μm; the first coating layer has a coating thickness of 4 μm, and the second coating layer has a coating thickness of 6 μm; the first binder has a coverage of 31% in the high viscosity region, and the second binder has a coverage of 11% in the low viscosity region.

Example 5

The preparation method is the same as that of Example 1, except that in Example 5, the first binder has a granularity of 5 μm, the second binder has a granularity of 28 μm; the first coating layer has a coating thickness of 4 μm, and the second coating layer has a coating thickness of 28 μm; the first binder has a coverage of 40% in the high viscosity region, and the second binder has a coverage of 7% in the low viscosity region.

Example 6

The preparation method is the same as that of Example 3, except that in Example 6, the first binder has a coverage of 20% in the high viscosity region, and the second binder has a coverage of 10% in the low viscosity region.

Example 7

The preparation method is the same as that of Example 3, except that in Example 7, the first binder has a coverage of 32% in the high viscosity region, and the second binder has a coverage of 18% in the low viscosity region.

Example 8

The preparation method is the same as that of Example 3, except that in Example 8, the first binder has a coverage of 39% in the high viscosity region, and the second binder has a coverage of 26% in the low viscosity region.

Example 9

The preparation method is the same as that of Example 3, except that in Example 9, the first binder has a coverage of 60% in the high viscosity region, and the second binder has a coverage of 31% in the low viscosity region.

Example 10

The preparation method is the same as that of Example 3, except that in Example 10, the first binder has a coverage of 49% in the high viscosity region, and the second binder has a coverage of 40% in the low viscosity region.

Example 11

The preparation method is the same as that of Example 3, except that in Example 11, the first binder has a granularity of 0.4 μm, the second binder has a granularity of 2.3 μm; the first coating layer has a coating thickness of 1 μm, and the second coating layer has a coating thickness of 3 μm.

Example 12

The preparation method is the same as that of Example 3, except that in Example 12, the first binder has a granularity of 0.9 μm, the second binder has a granularity of 3 μm; the first coating layer has a coating thickness of 2 μm, and the second coating layer has a coating thickness of 5 μm.

Example 13

The preparation method is the same as that of Example 3, except that in Example 13, the first binder has a granularity of 1.2 μm, the second binder has a granularity of 3.5 μm; the first coating layer has a coating thickness of 3 μm, and the second coating layer has a coating thickness of 8 μm.

Example 14

The preparation method is the same as that of Example 3, except that in Example 14, the first binder has a granularity of 1.5 μm, the second binder has a granularity of 6.1 μm; the first coating layer has a coating thickness of 4 μm, and the second coating layer has a coating thickness of 18 μm.

Example 15

The preparation method is the same as that of Example 3, except that in Example 15, the first binder has a granularity of 3 μm, the second binder has a granularity of 6.7 μm; the first coating layer has a coating thickness of 5 μm, and the second coating layer has a coating thickness of 21 μm.

Example 16

The preparation method is the same as that of Example 3, except that in Example 16, the first binder has a softening temperature of 50° C., the second binder has a softening temperature of 86° C., and the interfacial forming temperature is 60° C.

Example 17

The preparation method is the same as that of Example 3, except that in Example 17, the first binder has a softening temperature of 58° C., the second binder has a softening temperature of 80° C., and the interfacial forming temperature is 75° C.

Example 18

The preparation method is the same as that of Example 3, except that in Example 18, the first binder has a softening temperature of 69° C., the second binder has a softening temperature of 102° C., and the interfacial forming temperature is 70° C.

Example 19

The preparation method is the same as that of Example 3, except that in Example 19, the first binder has a softening temperature of 98° C., the second binder has a softening temperature of 149° C., and the interfacial forming temperature is 100° C.

Example 20

The preparation method is the same as that of Example 3, except that in Example 20, the first binder has a softening temperature of 138° C., the second binder has a softening temperature of 192° C., and the interfacial forming temperature is 100° C.

Example 21

The preparation method is the same as that of Example 3, except that in Example 21, the first binder has a softening temperature of 71° C., the second binder is polyacrylonitrile and has a softening temperature of 92° C., and the interfacial forming temperature is 75° C.

Example 22

The preparation method is the same as that of Example 3, except that in Example 22, the slurry is only coated to one side surface of the porous substrate to which the two-sided 2 μm thick ceramic coating layer has been coated (polyethylene, with thickness of 5 μm, average pore diameter of 0.073 μm, porosity of 26%).

Example 23

The preparation method is the same as that of Example 3, except that in Example 23, the slurry is directly coated to both side surfaces of the porous substrate (polyethylene, with thickness of 5 μm, average pore diameter of 0.073 μm, porosity of 26%).

Example 24

The preparation method is the same as that of Example 3, except that in Example 24, only the first binder slurry is coated to the head of the porous substrate (polyethylene, with thickness of 5 μm, average pore diameter of 0.073 μm, porosity of 26%), similar to the structure shown in FIG. 2.

Example 25

The preparation method is the same as that of Example 3, except that in Example 25, only the first binder slurry is coated to the tail of the porous substrate (polyethylene, with thickness of 5 μm, average pore diameter of 0.073 μm, porosity of 26%), similar to the structure shown in FIG. 2.

Example 26

The preparation method is the same as that of Example 3, except that in Example 26, the lithium-ion battery is of stacked type, the first binder has a softening temperature of 72° C., and the second binder has a softening temperature of 102° C.

Example 27

The preparation method is the same as that of Example 3, except that in Example 27, the lithium-ion battery is of stacked type, the first binder has a softening temperature of 72° C., the second binder has a softening temperature of 102° C., and the high viscosity region corresponds to both sides of the electrode assembly.

Example 28

The preparation method is the same as that of Example 3, except that in Example 28, the lithium-ion battery is of stacked type, the first binder has a softening temperature of 72° C., the second binder has a softening temperature of 102° C., and the high viscosity region corresponds to the circumference of the electrode assembly.

Example 29

The preparation method is the same as that of Example 3, except that in Example 29, the first binder has a a degree of swelling of 30%, and the second binder has a degree of swelling of 11%, the interfacial forming temperature is 60° C., and the second binder has a coverage of 31% in the low viscosity region.

Example 30

The preparation method is the same as that of Example 3, except that in Example 30, the first binder has a degree of swelling of 67%, and the second binder has a degree of swelling of 32%, the interfacial forming temperature is 75° C., and the second binder has a coverage of 31% in the low viscosity region.

Example 31

The preparation method is the same as that of Example 3, except that in Example 31, the first binder has a degree of swelling of 96%, and the second binder has a degree of swelling of 53%, the interfacial forming temperature is 70° C., and the second binder has a coverage of 31% in the low viscosity region.

Example 32

The preparation method is the same as that of Example 3, except that in Example 32, the first binder has a degree of swelling of 180%, and the second binder has a degree of swelling of 71%, the interfacial forming temperature is 80° C., and the second binder has a coverage of 31% in the low viscosity region.

Example 33

The preparation method is the same as that of Example 3, except that in Example 33, the first binder has a degree of swelling of 295%, and the second binder has a degree of swelling of 96%, the interfacial forming temperature is 100° C., and the second binder has a coverage of 31% in the low viscosity region.

Example 34

The preparation method is the same as that of Example 3, except that in Example 34, the first binder has a degree of swelling of 96%, and the second binder has a degree of swelling of 65%, the interfacial forming temperature is 75° C., and the second binder has a coverage of 31% in the low viscosity region.

Example 35

The preparation method is the same as that of Example 3, except that in Example 35, the lithium-ion battery is of stacked type, the first binder has a degree of swelling of 96%, and the second binder has a degree of swelling of 53%.

Example 36

The preparation method is the same as that of Example 3, except that in Example 36, the lithium-ion battery is of stacked type, the first binder has a degree of swelling of 96%, the second binder has a degree of swelling of 53%, and the high viscosity region corresponds to both sides of the electrode assembly.

Example 37

The preparation method is the same as that of Example 3, except that in Example 37, the lithium-ion battery is of stacked type, the first binder has a degree of swelling of 96%, the second binder has a degree of swelling of 53%, and the high viscosity region corresponds to the circumference of the electrode assembly.

Next, the test process of the lithium ion battery will be described.

1. Test for Adhesive Force

1) Disassembling the lithium ion battery, taking out the electrode assembly, and cutting the laminate to be tested at a plurality of different positions of the electrode assembly, the laminate being composed of a cathode current collector, a cathode active material layer, and a separator laminated in the following order Or consisting of a negative electrode current collector, a negative electrode active material layer, and a separator laminated in the following order, the laminate having a width of 20 mm and a length of 150 mm.

2) NITTO 5000NS double-sided tape is applied to a steel plate with a width of 30 mm and a length of 300 mm. The double-sided tape has a width of 30 mm and a length of 160 mm.

3) The cutted laminate to be tested is attached to the double-sided tape, and the positive current collector or the negative current collector surface of the laminate to be tested is bonded downward with the double-sided adhesive, and the surface of the positive current collector or the negative current collector is all bonded with double-sided tape.

4) Fold one end of the separator upward, fix it with the upper clamp, test the angle of 180°, and test its adhesion with a high-speed iron Al-3000 tensile machine, stretching speed: 50 mm/min, tensile displacement: 50 mm.

5) Calculate the adhesion force with the pull value f when the curve is flat and the displacement is greater than 10 mm, F=f*g(9.8N/kg)/0.02 (isolation film width), unit: N/m.

2. Cycle Performance Test

The lithium ion batteries prepared using all of the examples and comparative examples are repeatedly charged and discharged by the following procedures, the discharge capacity retention rate of the lithium ion battery is calculated.

Lithium-ion battery cycle performance test: the lithium-ion battery is placed in a 45° C. incubator and allowed to stand for 20 minutes to keep the lithium ion battery at a constant temperature. The lithium ion battery reaching constant temperature is charged at a constant current of 0.7 C to a voltage of chemical system full charge voltage (for example, 4.4 V), and then charged at a constant voltage of the chemical system full charge voltage to a current of 0.05 C, and then discharged to a voltage of the chemical system full discharge voltage (for example, 3.0 V) with a constant current of 1 C, which is a charge and discharge cycle. When the capacity for the first discharge is 100%, the charge and discharge cycle is repeated until the discharge capacity is attenuated to 80%, then the test is stopped, and the number of cycles is recorded as an index for evaluating the cycle performance of the lithium ion battery.

3. Softening Temperature Test

Figure 9:
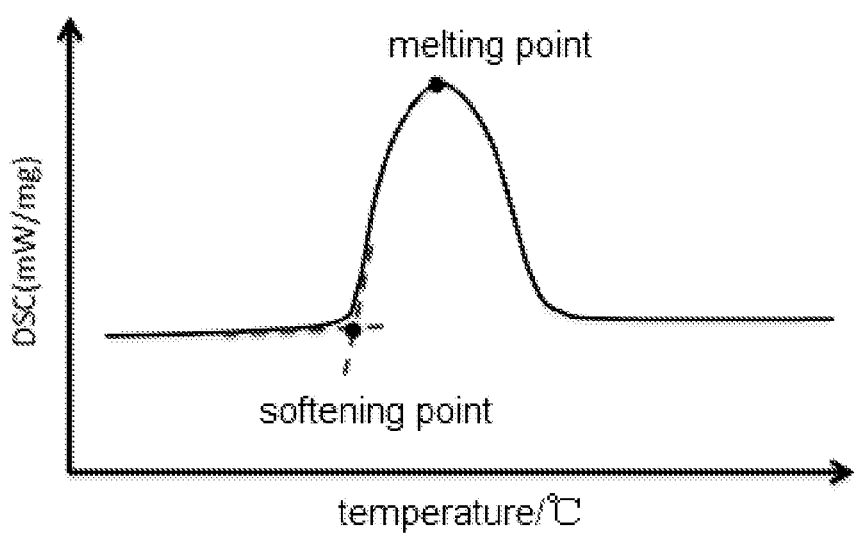
FIG. 9 shows a graph of softening temperature test (prior art).

The softening temperature is the temperature at which the polymer begins to melt. The DSC curve of the polymer is determined by differential scanning calorimetry (as shown below), and the starting point temperature of the melting peak (i.e., the temperature corresponding to the intersection of the two tangent points at the inflection point) is the softening temperature of the polymer, see FIG. 9.

3. Test for Degree of Swelling

Degree of swelling is the increase in mass of a polymer after it has been immersed in a specific electrolytic solution solvent for a certain period of time at a certain temperature. The specific test methods are as follows: a polymer is dissolved in a solvent of 1-methyl-2-pyrrolidone to form a membrane, dried, cut into a certain size (~2 g), and weighed $m_1$; the weighed membrane is placed in an electrolytic solution solvent (ethylene carbonate:ethyl methyl carbonate=1:1), soaked at 85° C. for 24 h; the membrane after immersion at 85° C. is taken out, and the solvent remaining on the surface is wiped dry with a filter paper, and $m_2$ is weighed, the degree of swelling having a value of $(m_2-m_1)/m_1$.

The experimental parameters and measurement results of Examples 1-37 and Comparative Examples 1-3 are shown in Table 1-Table 2 below. For convenience of comparison, the results of Table 1-2 are shown in groups.

TABLE 1

| Examples | Electrode assembly structure | Adhesive force in high viscosity region (N/m) | Adhesive force in low viscosity region (N/m) | Granularity in high viscosity region (um) | Granularity in low viscosity region (um) | Coverage in high viscosity region |
|---|---|---|---|---|---|---|
| 1 | Wound | 11.5 | 4.9 | 0.05 | 0.5 | 60% |
| 2 | Wound | 6.6 | 4.3 | 0.4 | 1.3 | 31% |
| 3 | Wound | 4.1 | 3 | 1.5 | 2.8 | 31% |
| 4 | Wound | 3.4 | 1.9 | 2.6 | 5.9 | 31% |
| 5 | Wound | 2.2 | 1.1 | 5 | 28 | 40% |
| 6 | Wound | 2.9 | 1.4 | 1.5 | 2.8 | 20% |
| 7 | Wound | 7.3 | 2.2 | 1.5 | 2.8 | 32% |
| 8 | Wound | 22 | 2.5 | 1.5 | 2.8 | 39% |
| 3 | Wound | 4.1 | 3 | 1.5 | 2.8 | 31% |
| 9 | Wound | 58 | 3 | 1.5 | 2.8 | 60% |
| 10 | Wound | 30 | 5 | 1.5 | 2.8 | 49% |
| 11 | Wound | 7.3 | 5.7 | 0.4 | 2.3 | 31% |
| 12 | Wound | 7.9 | 2.7 | 0.9 | 3 | 31% |
| 13 | Wound | 6.7 | 2.1 | 1.2 | 3.5 | 31% |
| 3 | Wound | 4.1 | 3 | 1.5 | 2.8 | 31% |
| 14 | Wound | 4.1 | 1.3 | 1.5 | 6.1 | 31% |
| 15 | Wound | 2.8 | 0.8 | 3 | 6.7 | 31% |
| 16 | Wound | 5 | 1.4 | 1.5 | 2.8 | 31% |
| 17 | Wound | 7.3 | 3 | 1.5 | 2.8 | 31% |
| 18 | Wound | 22 | 0.5 | 1.5 | 2.8 | 31% |
| 3 | Wound | 4.1 | 3 | 1.5 | 2.8 | 31% |
| 19 | Wound | 4 | 1 | 1.5 | 2.8 | 31% |
| 20 | Wound | 2.1 | 0.5 | 1.5 | 2.8 | 31% |
| 21 | Wound | 6 | 3 | 1.5 | 2.8 | 31% |
| 22 | Wound | 4.1 | 3 | 1.5 | 2.8 | 31% |
| 3 | Wound | 4.1 | 3 | 1.5 | 2.8 | 31% |
| 23 | Wound | 4.1 | 3 | 1.5 | 2.8 | 31% |
| 24 | Wound | 4.1 | 3 | 1.5 | 2.8 | 31% |
| 25 | Wound | 4.1 | 3 | 1.5 | 2.8 | 31% |
| 26 | Stacked | 4.1 | 3 | 1.5 | 2.8 | 31% |
| 27 | Stacked | 4.1 | 3 | 1.5 | 2.8 | 31% |
| 28 | Stacked | 4.1 | 3 | 1.5 | 2.8 | 31% |
| 29 | Wound | 1 | 0.3 | 1.5 | 2.8 | 31% |
| 30 | Wound | 2.3 | 1.1 | 1.5 | 2.8 | 31% |
| 31 | Wound | 4.5 | 1.8 | 1.5 | 2.8 | 31% |
| 32 | Wound | 8 | 2.5 | 1.5 | 2.8 | 31% |
| 33 | Wound | 12 | 4.5 | 1.5 | 2.8 | 31% |

TABLE 1-continued

| | | | | | | |
|---|---|---|---|---|---|---|
| 34 | Wound | 4.5 | 2.5 | 1.5 | 2.8 | 31% |
| 35 | Stacked | 4.1 | 3 | 1.5 | 2.8 | 31% |
| 36 | Stacked | 4.1 | 3 | 1.5 | 2.8 | 31% |
| 37 | Stacked | 4.1 | 3 | 1.5 | 2.8 | 31% |
| 1 | Wound | 10 | 10 | 1.5 | 1.5 | 31% |
| 2 | Wound | 0.1 | 0.1 | 1.5 | 1.5 | 15% |
| 3 | Stacked | 10 | 10 | 1.5 | 1.5 | 31% |

| Examples | Coverage in low viscosity region | Thickness in high viscosity region (um) | Thickness in low viscosity region (um) | Softening temperature in high viscosity region (° C.) | Softening temperature in low viscosity region (° C.) | Interfacial forming temperature (° C.) |
|---|---|---|---|---|---|---|
| 1 | 25% | 0.5 | 1 | — | — | 80 |
| 2 | 22% | 4 | 4 | — | — | 80 |
| 3 | 17% | 4 | 4 | — | — | 80 |
| 4 | 11% | 4 | 6 | — | — | 80 |
| 5 | 7% | 4 | 28 | — | — | 80 |
| 6 | 10% | 4 | 4 | — | — | 80 |
| 7 | 18% | 4 | 4 | — | — | 80 |
| 8 | 26% | 4 | 4 | — | — | 80 |
| 3 | 17% | 4 | 4 | — | — | 80 |
| 9 | 31% | 4 | 4 | — | — | 80 |
| 10 | 40% | 4 | 4 | — | — | 80 |
| 11 | 17% | 1 | 3 | — | — | 80 |
| 12 | 17% | 2 | 5 | — | — | 80 |
| 13 | 17% | 3 | 8 | — | — | 80 |
| 3 | 17% | 4 | 4 | — | — | 80 |
| 14 | 17% | 4 | 18 | — | — | 80 |
| 15 | 17% | 5 | 21 | — | — | 80 |
| 16 | 17% | 4 | 4 | 50 | 86 | 60 |
| 17 | 17% | 4 | 4 | 58 | 80 | 75 |
| 18 | 17% | 4 | 4 | 69 | 102 | 70 |
| 3 | 17% | 4 | 4 | — | — | 80 |
| 19 | 17% | 4 | 4 | 98 | 149 | 100 |
| 20 | 17% | 4 | 4 | 138 | 192 | 100 |
| 21 | 17% | 4 | 4 | 71 | 92 | 75 |
| 22 | 17% | 4 | 4 | — | — | 80 |
| 3 | 17% | 4 | 4 | — | — | 80 |
| 23 | 17% | 4 | 4 | — | — | 80 |
| 24 | 17% | 4 | 4 | — | — | 80 |
| 25 | 17% | 4 | 4 | — | — | 80 |
| 26 | 17% | 4 | 4 | 72 | 102 | 80 |
| 27 | 17% | 4 | 4 | 72 | 102 | 80 |
| 28 | 17% | 4 | 4 | 72 | 102 | 80 |
| 29 | 31% | 4 | 4 | — | — | 60 |
| 30 | 31% | 4 | 4 | — | — | 75 |
| 31 | 31% | 4 | 4 | — | — | 70 |
| 32 | 31% | 4 | 4 | — | — | 80 |
| 33 | 31% | 4 | 4 | — | — | 100 |
| 34 | 31% | 4 | 4 | — | — | 75 |
| 35 | 17% | 4 | 4 | — | — | 80 |
| 36 | 17% | 4 | 4 | — | — | 80 |
| 37 | 17% | 4 | 4 | — | — | 80 |
| 1 | 31% | 4 | 4 | — | — | 80 |
| 2 | 15% | 4 | 4 | — | — | 80 |
| 3 | 31% | 4 | 4 | — | — | 80 |

TABLE 2

| Examples | Electrode assembly structure | Adhesive force in high viscosity region (N/m) | Adhesive force in low viscosity region (N/m) | Granularity in high viscosity region (um) | Granularity in low viscosity region (um) | Degree of swelling in high viscosity region | Degree of swelling in low viscosity region | Position of electrode assembly corresponding to high viscosity coating layer | Is there a black spot in the high viscosity region? | Is there a black spot in the low viscosity region? | Cycle performance (cycle) |
|---|---|---|---|---|---|---|---|---|---|---|---|
| 1 | Wound | 11.5 | 4.9 | 0.05 | 0.5 | — | — | Head and tail | Slight black spots | No | 1000 |
| 2 | Wound | 6.6 | 4.3 | 0.4 | 1.3 | — | — | Head and tail | No | No | 1500 |
| 3 | Wound | 4.1 | 3 | 1.5 | 2.8 | — | — | Head and tail | No | No | 1300 |
| 4 | Wound | 3.4 | 1.9 | 2.6 | 5.9 | — | — | Head and tail | No | No | 1100 |
| 5 | Wound | 2.2 | 1.1 | 5 | 28 | — | — | Head and tail | No | No | 700 |
| 6 | Wound | 2.9 | 1.4 | 1.5 | 2.8 | — | — | Head and tail | No | No | 1000 |

TABLE 2-continued

| Examples | Electrode assembly structure | Adhesive force in high viscosity region (N/m) | Adhesive force in low viscosity region (N/m) | Granularity in high viscosity region (um) | Granularity in low viscosity region (um) | Degree of swelling in high viscosity region | Degree of swelling in low viscosity region | Position of electrode assembly corresponding to high viscosity coating layer | Is there a black spot in the high viscosity region? | Is there a black spot in the low viscosity region? | Cycle performance (cycle) |
|---|---|---|---|---|---|---|---|---|---|---|---|
| 7 | Wound | 7.3 | 2.2 | 1.5 | 2.8 | — | — | Head and tail | No | No | 1100 |
| 8 | Wound | 22 | 2.5 | 1.5 | 2.8 | — | — | Head and tail | No | No | 1500 |
| 3 | Wound | 4.1 | 3 | 1.5 | 2.8 | — | — | Head and tail | No | No | 1300 |
| 9 | Wound | 58 | 3 | 1.5 | 2.8 | — | — | Head and tail | No | No | 1000 |
| 10 | Wound | 30 | 5 | 1.5 | 2.8 | — | — | Head and tail | No | No | 1000 |
| 11 | Wound | 7.3 | 5.7 | 0.4 | 2.3 | — | — | Head and tail | No | No | 1000 |
| 12 | Wound | 7.9 | 2.7 | 0.9 | 3 | — | — | Head and tail | No | No | 1100 |
| 13 | Wound | 6.7 | 2.1 | 1.2 | 3.5 | — | — | Head and tail | No | No | 1150 |
| 3 | Wound | 4.1 | 3 | 1.5 | 2.8 | — | — | Head and tail | No | No | 1300 |
| 14 | Wound | 4.1 | 1.3 | 1.5 | 6.1 | — | — | Head and tail | No | No | 1250 |
| 15 | Wound | 2.8 | 0.8 | 3 | 6.7 | — | — | Head and tail | No | No | 1300 |
| 16 | Wound | 5 | 1.4 | 1.5 | 2.8 | — | — | Head and tail | No | No | 1200 |
| 17 | Wound | 7.3 | 3 | 1.5 | 2.8 | — | — | Head and tail | No | No | 1400 |
| 18 | Wound | 22 | 0.5 | 1.5 | 2.8 | — | — | Head and tail | No | No | 1200 |
| 3 | Wound | 4.1 | 3 | 1.5 | 2.8 | — | — | Head and tail | No | No | 1300 |
| 19 | Wound | 4 | 1 | 1.5 | 2.8 | — | — | Head and tail | No | No | 1300 |
| 20 | Wound | 2.1 | 0.5 | 1.5 | 2.8 | — | — | Head and tail | No | No | 1100 |
| 21 | Wound | 6 | 3 | 1.5 | 2.8 | — | — | Head and tail | No | No | 1500 |
| 22 | Wound | 4.1 | 3 | 1.5 | 2.8 | — | — | Head and tail/single-sided | No | No | 1260 |
| 3 | Wound | 4.1 | 3 | 1.5 | 2.8 | — | — | Head and tail | No | No | 1300 |
| 23 | Wound | 4.1 | 3 | 1.5 | 2.8 | — | — | Head and tail/without inorganic coating layer | No | No | 1390 |
| 24 | Wound | 4.1 | 3 | 1.5 | 2.8 | — | — | Head/without inorganic coating layer | No | No | 1220 |
| 25 | Wound | 4.1 | 3 | 1.5 | 2.8 | — | — | Tail/without inorganic coating layer | No | No | 1180 |
| 26 | Stacked | 4.1 | 3 | 1.5 | 2.8 | — | — | Head and tail | No | No | 1200 |
| 27 | Stacked | 4.1 | 3 | 1.5 | 2.8 | — | — | Two sides | No | No | 1300 |
| 28 | Stacked | 4.1 | 3 | 1.5 | 2.8 | — | — | Circumference | No | No | 1500 |
| 29 | Wound | 1 | 0.3 | 1.5 | 2.8 | 30% | 11% | Head and tail | No | No | 700 |
| 30 | Wound | 2.3 | 1.1 | 1.5 | 2.8 | 67% | 32% | Head and tail | No | No | 1400 |
| 31 | Wound | 4.5 | 1.8 | 1.5 | 2.8 | 96% | 53% | Head and tail | No | No | 1200 |
| 32 | Wound | 8 | 2.5 | 1.5 | 2.8 | 180% | 71% | Head and tail | No | No | 1300 |
| 33 | Wound | 12 | 4.5 | 1.5 | 2.8 | 295% | 96% | Head and tail | No | No | 1300 |
| 34 | Wound | 4.5 | 2.5 | 1.5 | 2.8 | 96% | 65% | Head and tail | No | No | 1500 |
| 35 | Stacked | 4.1 | 3 | 1.5 | 2.8 | 96% | 53% | Head and tail | No | No | 1200 |
| 36 | Stacked | 4.1 | 3 | 1.5 | 2.8 | 96% | 53% | Two sides | No | No | 1300 |
| 37 | Stacked | 4.1 | 3 | 1.5 | 2.8 | 96% | 53% | Circumference | No | No | 1500 |
| 1 | Wound | 10 | 10 | 1.5 | 1.5 | — | — | — | No | Yes | 700 |
| 2 | Wound | 0.1 | 0.1 | 1.5 | 1.5 | — | — | — | Yes | No | 400 |
| 3 | Stacked | 10 | 10 | 1.5 | 1.5 | — | — | — | Yes | Yes | 700 |

By comparing Comparative Example 1-2 with Examples 1-23, it can be seen that by differentiating the binder in the first coating layer and the second coating layer to meet the need for binder differentiation in the first coating layer and the second coating layer, the surface of the positive or negative electrode of the electrochemical device is substantially free of lithium precipitation/black spots, and the cycle performance of the electrochemical device is greatly prolonged.

By comparing Examples 1-5, it can been seen that as the granularity of the first binder and the second binder increases, the adhesive force between the first coating layer and the positive or negative electrode changes accordingly and the cycle performance of the lithium ion battery also changes accordingly, indicating that the granularity of the first binder and the second binder affects the adhesive force between the first coating layer and the positive or negative electrode and the cycle performance of the lithium ion battery.

By comparing Examples 3 and 6-10, it can be seen that the coverage of the first coating layer also affects the adhesive force between the first coating layer and the positive or negative electrode and the cycling performance of the lithium ion battery.

By comparing Examples 3 and 11-15, it can be seen that as the thickness of the first coating layer increases, the cycle performance of the lithium ion battery tends to increase.

By comparing Examples 3 and 16-21, it can be seen that by the differential arrangement of the softening temperature of the first binder of the first coating layer and the second binder of the second coating layer, the lithium ion battery has no black spots/lithium precipitation, and may effectively improve the cycle performance of the lithium ion battery.

By comparing Examples 3 and 22-23, it can be seen that regardless of whether the first coating layer is disposed on the inorganic coating layer or the first coating layer is directly disposed on the porous substrate and the first coating is single-sided or double-sided, the black spot/lithium precipitation problem of the lithium ion battery may be improved, and the cycle performance may be effectively improved.

By comparing Examples 3 and 24-25, it can be seen that when the first coating is only disposed on the head or the tail of the porous substrate, the black spot/lithium precipitation problem of the lithium ion battery may be improved, and the cycle performance can be improved, but the improvement effect are limited.

By comparing Examples 29-34, it can be seen that by the differential arrangement of the degrees of swelling of the first binder and the second binder, the lithium ion battery has no black spots/lithium precipitation, and may effectively improve the cycle performance of the lithium ion battery.

By comparing Examples 26-28 and Examples 35-37 and Comparative Example 3, it can be seen that the non-uniform first coating layer design of the present application is also applicable to the stacked electrode assembly, and may also enhance the adhesive force between the separator and the positive or negative electrode and achieve better cycle performance.

Those skilled in the art will appreciate that the above-described examples are merely exemplary examples, and various changes, substitutions and changes may be made without departing from the spirit and scope of the present application.

What is claimed is:

1. An electrochemical device, comprising:
   a positive electrode;
   a negative electrode;
   and a separator disposed between the positive electrode and the negative electrode,
   wherein the separator comprises a porous substrate, a first coating layer and a second coating layer,
   the first coating layer and the second coating layer are disposed on a surface of the porous substrate,
   the first coating layer includes a first binder, and the second coating layer includes a second binder,
   wherein an adhesive force between the first coating layer and the positive electrode or between the first coating layer and the negative electrode is greater than an adhesive force between the second coating layer and the positive electrode or between the second coating layer and the negative electrode, and
   wherein a granularity of the first binder is less than a granularity of the second binder.

2. The electrochemical device according to claim 1, wherein the electrochemical device comprises at least two first coating layers, and the second coating layer is disposed between two first coating layers.

3. The electrochemical device according to claim 1, wherein the first coating layer is disposed to surround the second coating layer.

4. The electrochemical device according to claim 1, wherein the adhesive force between the first coating layer and the positive electrode or between the first coating layer and the negative electrode is from 1 N/m to 100 N/m, and the adhesive force between the second coating layer and the positive electrode or between the second coating layer and the negative electrode is from 0.2 N/m to 5 N/m.

5. The electrochemical device according to claim 1, wherein a ratio of a width of the first coating layer to a total width of a coating in a width direction of the first coating layer is less than or equal to 25%.

6. The electrochemical device according to claim 1, wherein a thickness of the first coating layer is less than a thickness of the second coating layer.

7. The electrochemical device according to claim 5, wherein the first coating has a width of 1 mm to 125 mm.

8. The electrochemical device according to claim 6, wherein the first coating layer has a thickness of 0.05 µm to 5 µm, and the second coating layer has a thickness of 0.1 µm to 30 µm.

9. The electrochemical device according to claim 1, wherein the first binder has a granularity of 10 nm to 5 µm, and the second binder has a granularity of 0.5 µm to 30 µm.

10. The electrochemical device according to claim 1, wherein a softening temperature of the first binder is less than a softening temperature of the second binder.

11. The electrochemical device according to claim 10, wherein the first binder has a softening temperature of 50° C. to 150° C., and the second binder has a softening temperature of 80° C. to 200° C.

12. The electrochemical device according to claim 1, wherein a degree of swelling of the first binder is greater than a degree of swelling of the second binder.

13. The electrochemical device according to claim 12, wherein the first binder has a degree of swelling of 30% to 300%, and the second binder has a degree of swelling of 1% to 100%.

14. The electrochemical device according to claim 1, further comprising a third coating layer disposed between the porous substrate and the first coating layer and between the porous substrate and the second coating layer, the third coating layer including inorganic particles and a third binder.

15. The electrochemical device according to claim 1, wherein the first binder and the second binder are each selected from the group consisting of polyvinylidene fluoride, polyvinylidene fluoride-hexafluoroethylene, polyacrylate, polymethyl methacrylate, polyethylene oxide, polyacrylonitrile and styrene butadiene rubber.

16. The electrochemical device according to claim 1, wherein a front side of the porous substrate and a back side of the porous substrate are provided with the first coating layer and the second coating layer.

17. The electrochemical device according to claim 1, wherein the porous substrate is a polymer film, a multilayer polymer film, or a nonwoven fabric formed of one or more selected from the group consisting of polyethylene, polypropylene, polyethylene terephthalate, polyphthalaldehyde phenyl diamine, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene.

18. The electrochemical device according to claim 1, wherein the first coating layer is only disposed on one side of the second coating layer.

19. The electrochemical device according to claim 1, wherein the electrochemical device comprises a lithium ion battery.

* * * * *